April 6, 1965 P. J. RICHARTZ 3,177,497
SPEED RESPONSIVE EXPOSURE CONTROL IN A MOTION PICTURE CAMERA
Filed Dec. 19, 1960 3 Sheets-Sheet 1
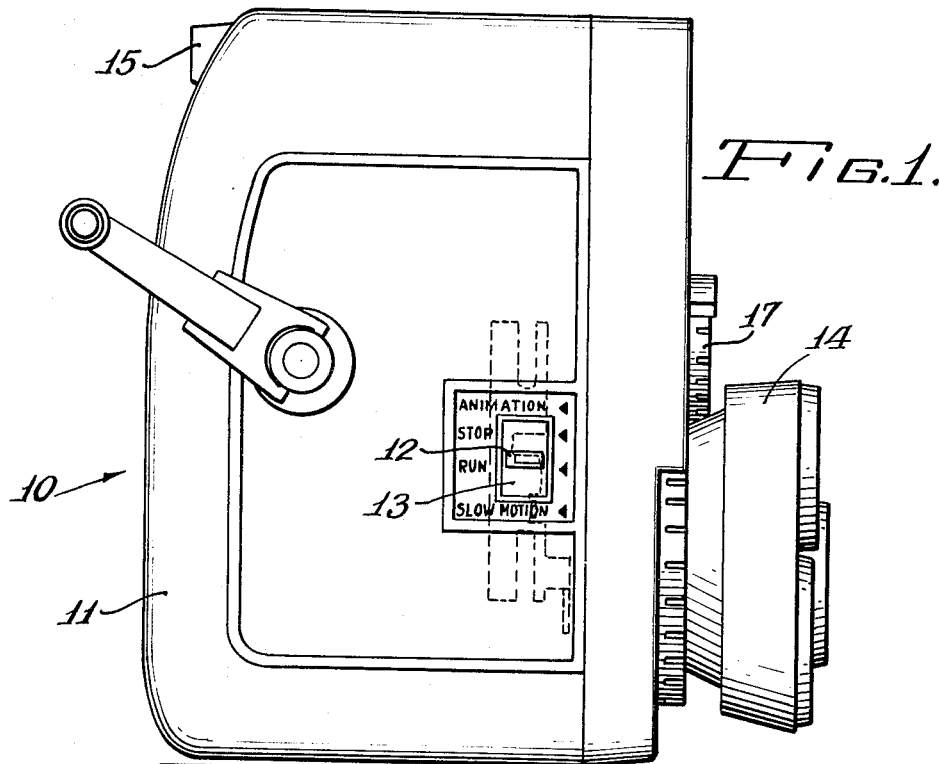
Fig.1.
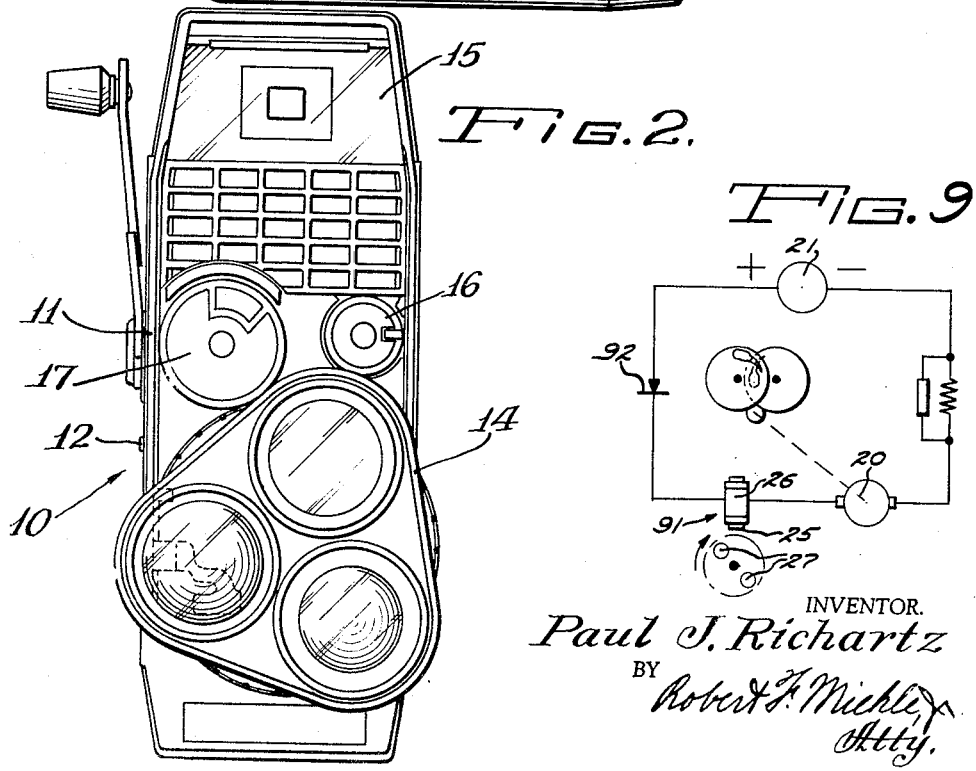
Fig.2.
Fig.9
INVENTOR.
Paul J. Richartz
BY
Robert F. Michle
Atty.

April 6, 1965 P. J. RICHARTZ 3,177,497
SPEED RESPONSIVE EXPOSURE CONTROL IN A MOTION PICTURE CAMERA
Filed Dec. 19, 1960 3 Sheets-Sheet 2
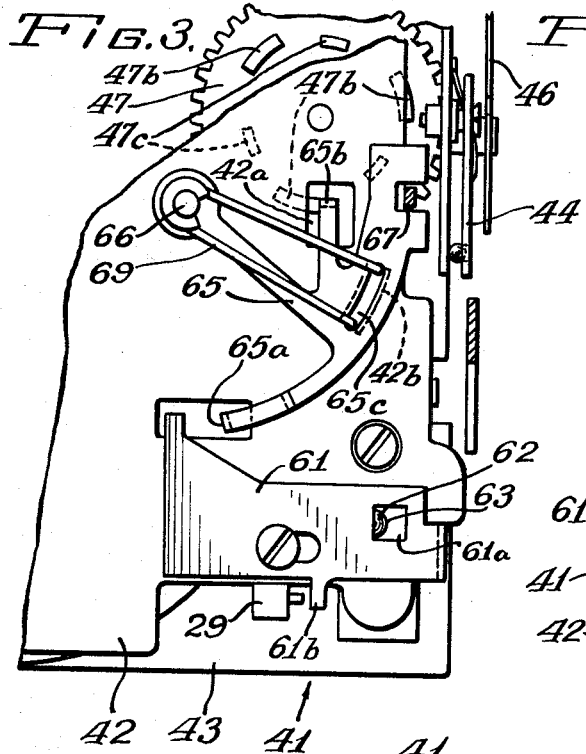
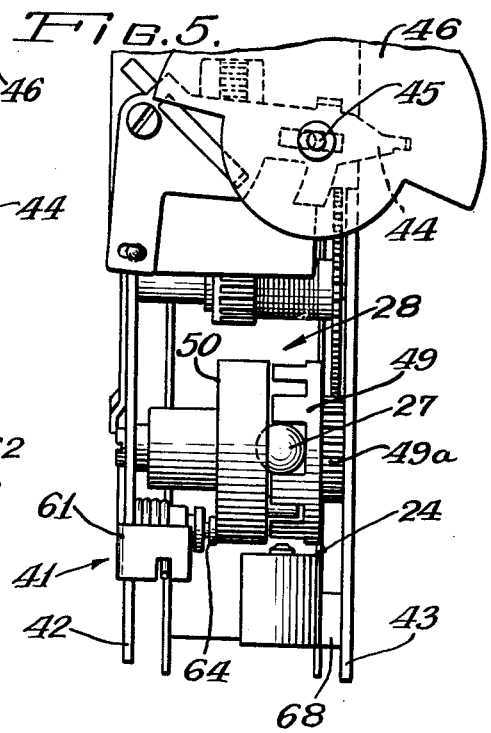
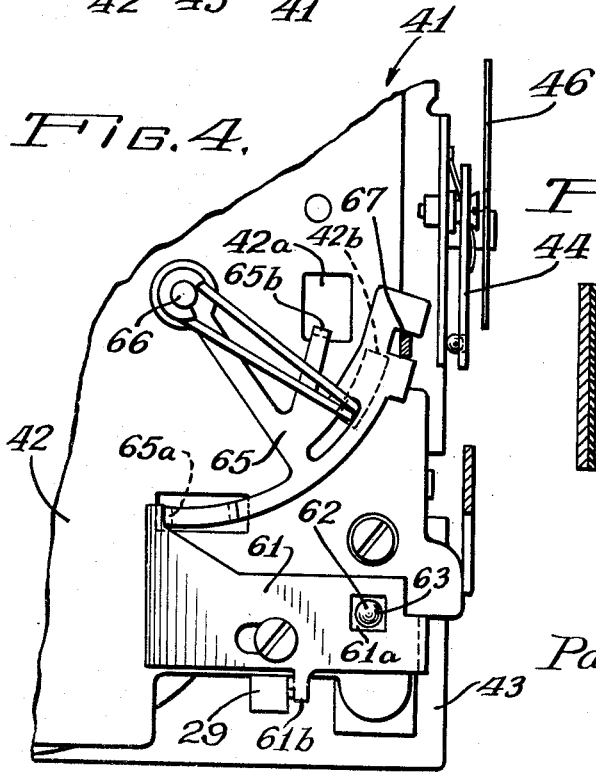
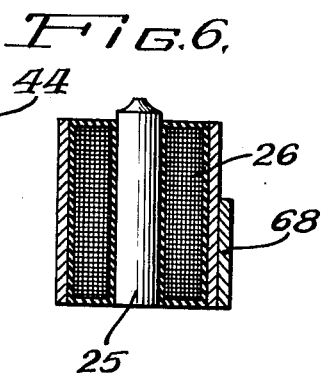
INVENTOR.
Paul J. Richartz
BY Robert F. Miehle
Atty.

April 6, 1965 P. J. RICHARTZ 3,177,497
SPEED RESPONSIVE EXPOSURE CONTROL IN A MOTION PICTURE CAMERA
Filed Dec. 19, 1960 3 Sheets-Sheet 3
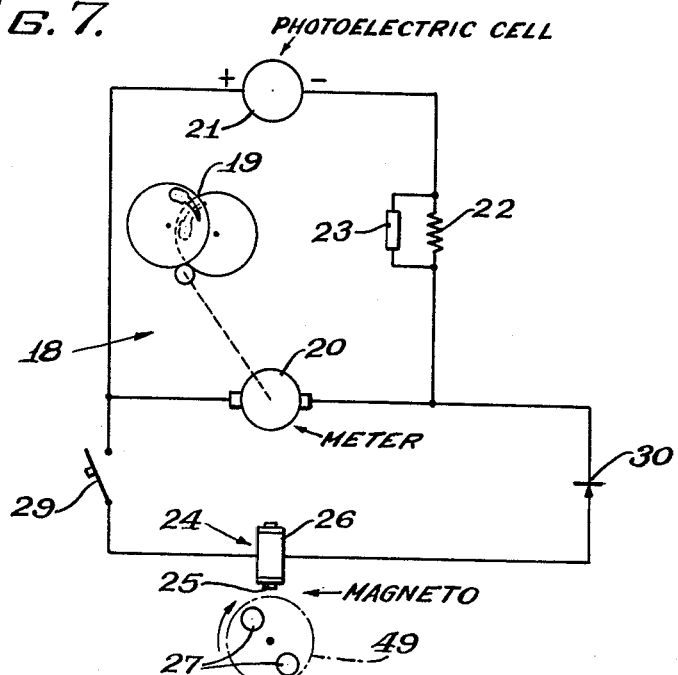
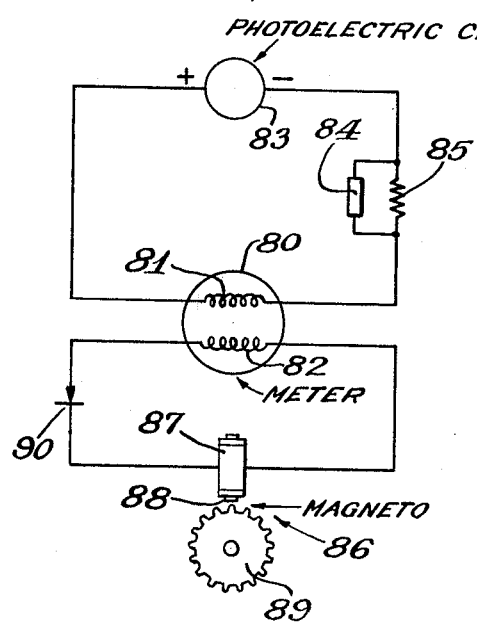
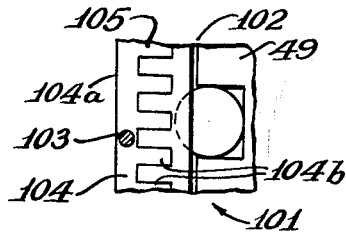
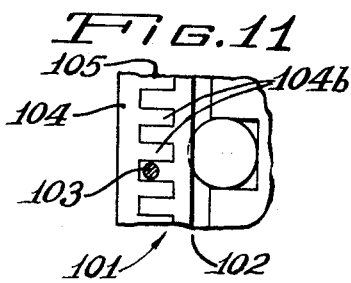
Inventor:
Paul J. Richartz
By Robert F. Miehle
Atty.

United States Patent Office 3,177,497
Patented Apr. 6, 1965

3,177,497
SPEED RESPONSIVE EXPOSURE CONTROL IN A MOTION PICTURE CAMERA
Paul J. Richartz, Lincolnwood, Ill., assignor to Bell & Howell Company, Chicago, Ill., a corporation of Illinois
Filed Dec. 19, 1960, Ser. No. 76,781
4 Claims. (Cl. 352—141)

This invention relates to a motion picture camera, and more particularly to a speed compensated automatic exposure control for a camera.

An object of the invention is to provide a multi-speed motion picture camera having an automatic exposure control together with means responsive to speed of the camera for adjusting the automatic exposure control.

Another object of the invention is to provide a motion picture camera having different shutter speeds and a generator responsive to speed of the shutter for supplying a compensating voltage to an exposure control circuit controlled by a photoelectric cell to reduce stopping down of the camera lens at the higher speed.

Another object of the invention is to provide a camera in which a diaphragm is adjusted by a meter driven by a photoelectric cell responsive to scene brightness and a magneto responsive to shutter speed of the camera serves to actuate the meter in opposition to the photoelectric cell so that as the shutter speed is higher, the opposition of the magneto to the cell is greater.

A complete understanding of the invention may be obtained from the following detailed description of cameras forming specific embodiments thereof, when read in conjunction with appended drawings, in which:

FIG. 1 is a side elevation view of a camera forming one embodiment of the invention;

FIG. 2 is a front elevation view of the camera shown in FIG. 1:

FIG. 3 is a fragmentary side elevation view of the mechanism of the camera shown in FIG. 1;

FIG. 4 is a view similar to FIG. 3 but with elements of the mechanism in positions different from those shown in FIG. 3;

FIG. 5 is a fragmentary front elevation view of the mechanism shown in FIG. 3;

FIG. 6 is an enlarged vertical sectional view of a coil and core forming a portion of a magneto device for affecting the automatic exposure control device of the camera to compensate for different shutter speeds;

FIG. 7 is a schematic view of a control circuit of the camera shown in FIG. 1 and including the magneto shown in FIG. 6;

FIG. 8 is a schematic view of a control circuit comprising a modification of the circuit shown in FIG. 7;

FIG. 9 is a schematic view of a control circuit forming a further modification of the invention; and FIGS. 10 and 11 are fragmentary elevation views of a camera forming a further embodiment of the invention.

The invention provides a camera having at least two shutter speeds together with automatic exposure control means and magneto means responsive to the shutter speed for modifying the action of the automatic exposure control means in accordance with the shutter speed. Preferably the exposure control means includes a diaphragm driven in a closing direction by an electric meter supplied with power from a photo-electric cell, and the magneto means is connected to the meter during operation of the camera at a high shutter speed so as to oppose the action of the photo-electric cell on the meter and cause the diaphragm to be more open than it otherwise would be. Preferably switch means are provided for connecting and disconnecting the magneto means to and from the meter, and the switch means is actuated by the manual control of the camera which controls the shutter speed of the camera.

Referring now in detail to the drawings, a camera 10 shown therein includes a housing 11 (FIGS. 1 and 2) with a manually operable drive control button 12 and slide member 13 which may be moved selectively upwardly from the "Stop" position thereof shown in FIG. 1 to an "Animation" position, downwardly to a "Run" position of normal speed, and downwardly to a higher speed or "Slow Motion" position. The camera includes a turret lens system or optical objective 14, a viewfinder 15, a film speed control member 16, and a manual override control 17 of an automatic exposure control device 18 shown schematically in FIG. 7. Preferably the exposure control device 18 shown in FIG. 7 is generally of the type disclosed and claimed in Bagby et al. Patents 2,841,064 and 2,858,754, and includes a diaphragm mechanism 19 driven by an electric meter or galvanometer 20. The meter is spring biased toward a position in which the diaphragm mechanism 19 is wide open, and, in accordance with the brightness of the scene to be photographed, a photo-electric cell 21 of the photovoltaic type supplies power to the meter tending to close the diaphragm mechanism 19. The construction and operation of the meter 20, diaphragm mechanism 19 and cell 21 is disclosed in greater detail in the above mentioned patents. A resistor 22 and thermistor 23 are provided in series with the meter 20 to compensate for temperature variations. To cause the diaphragm mechanism to be more open when the camera is operated for "Slow Motion" in which the shutter speed is much higher than at normal speed or "Run" operation of the camera, a magneto device 24 is provided. The magneto device includes a stator including a permanent magnet core 25 and a coil 26 and a rotor comprising revolved balls 27 of steel or other magnetic material of a governor 28 of the camera. The construction and operation of the governor 28 itself are disclosed and claimed in co-pending application Serial No. 844,548, filed October 5, 1959, and assigned to the same assignee as the instant application. When a switch 29 is closed when the camera is actuated for slow motion, the electro-motive force generated in the coil 26 and rectified by rectifier 30 is applied to the meter 20 in opposition to the force of the cell 21 to lessen the effect of the cell 21 on the meter and cause the diaphragm mechanism to be less closed than it otherwise would be.

In FIGS. 3, 4 and 5, there is shown the mechanism 41 of the camera which includes frame plates 42 and 43 serving to support a spring drive motor (not shown) of a known type which drives a shuttle or pull-down 44 to intermittently advance the perforated film past the aperture and objective. The shuttle is driven by a crank pin 45. A shutter 46 is keyed to the crank pin 45. The crank pin 46 is keyed to the crank pin 45. The crank pin 45 and shutter 46 are driven by a gear 47 driven by the spring motor or drive to both advance the film past the aperture and expose the frames of film sequentially at the aperture and in alignment with the lens and exposure control or diaphragm mechanism 19. The speed at which the shutter 46 is revolved and at which the shuttle 44 is reciprocated to advance the film is controlled precisely by the governor 28, which includes a spider-like driving member 49 of non-magnetic material such as, for example, a polystyrene compound. The member 49 is driven by the shutter drive gearing through a gear portion 49a integral therewith, and drives a driven member 50 splined to the member 49. The member 49 also revolves the balls 27.

At normal speed operation of the camera, a spring-pressed plate 61 holds a ball 62 (FIG. 3) pressed into a tubular guide 63 to hold a brake shoe or rod 64 (FIG. 5) in its farthest position to the right, and, as the balls 27 are revolved, they press the member 50 to the left against the brake rod 64 with a force dependent on the speed within a given range. This braking slows the rotation of the members 49 and 50 and the shutter drive mechanism to the desired shutter and shuttle speed of, for example, sixteen frames per second. When it is desired to run the camera at the higher or "Slow Motion" speed, the plate 61 is pushed to the left, as viewed in FIG. 3, by tab 65a of an arm 65 pivoted on pin 66 and connected to arm 67 of the manual control slide 13 until opening 61a in the plate 61 uncovers the ball 62 to permit the ball to come farther out of the guide 63. This permits the brake rod 64 to be moved farther to the left, as viewed in FIG. 5, as the member 50 is urged to the left by the balls 27, which, in turn, permits the member 50 to be moved farther to the left as limited by the brake rod 64. This greater movement of the member 50 permits the balls 27 to move by centrifugal force radially outwardly relative to the members 49 and 50 as described in the above mentioned co-pending application Serial No. 844,548. Due to the shape of the member 50, the balls 27 then exert less axial force on the member 50 to decrease the braking force on the member 50 and the shutter drive train, which then rotates the shutter and reciprocates the shuttle at predetermined higher rates of speed and, of course, revolves the balls 27 at the predetermined higher rate of speed. The governor at this higher speed or "Slow Motion" setting causes the balls 27 to move radially outwardly so that they describe a path closer to the tip of the magnet core 25 and generate a greater change in flux in the magnet because of the closer path and also because of the higher rate of rotation thereof. The coil 26 is mounted in a fixed position by a bracket 68 secured to the plate 43. The switch 29 may be mounted on the plate 42 in a fixed position such as to be closed by a tab 61b when the arm 65 moves the slide 61 to the "Slow Motion" position thereof. If desired, the switch 29 could be omitted, and the different positions of the balls 27 for the two different operating speeds be permitted to control the amount of current generated in the magneto. That is, at the slow speed, the balls are spaced substantially farther radially inwardly in the governor so that their effect on the magnet core 25 is quite small but when the governor is set for high speed operation, the balls move along a path much closer to the core 25 and also much faster so that there is a much higher voltage generated in the coil 26.

The arm 65 has a tab 65b projecting through slot 42a in the mounting plate 42, and the tab 65b projects between lugs 47a of gear 47 to lock the drive means when the arm is in its "stop" position as shown in FIG. 3 in which it is normally held by torsion spring 69 which is coiled around the pin 66 and has ends projecting through a slot 65c in the arm 65 and through an anchoring slot 42b in the plate 42. When the arm 65 is moved by the manual control slide 13 to the "Run" or normal speed operation the tab 65b is moved out of blocking position relative to the lugs 47b to release the gear 47 and the shutter drive for operation.

When the slide 13 (FIG. 1) is pushed up to its "Animation" position, the tab 65b (FIG. 3) is moved radially inwardly relative to the gear 47 and out of the path of the engaged lug 47b and into the path of the next lug 47c. This permits the shutter 46 to expose one frame, and then, as the button 12 (FIG. 1) is released, the spring 69 (FIG. 3) moves the arm 65 back to the "Stop" position and the lug 65b moves radially out of engagement with the lug 47c and into the path of the next succeeding lug 47b, which permits the drive mechanism to move the shuttle through its feed stroke and the shutter through its movement simultaneously with the feed stroke of the shuttle.

When the camera is set for "Slow Motion" operation of, for example, forty-eight frames per second as compared with sixteen frames per second for normal operation, the magneto supplies a current to the meter opposing that of the direct current photocell 21 for one-half of each cycle of the magneto, the rectifier 30 permitting this half cycle of current to flow and blocking the flow of current from the magneto during the other half of the alternating current cycle. During the half cycle in which the magneto generates voltage of a polarity causing current to flow through the rectifier, the voltage across the coil opposes the D.C. voltage of the photoelectric cell 21 and permits a predetermined amount of shunting of the meter 20. During the other half of the cycle, the rectifier blocks the flow of the current that would supplement the current generated by the photo-electric cell 21.

In FIG. 8 there is shown a circuit forming a modification of the invention which is disclosed and claimed in co-pending application Serial No. 76,734, filed December 19, 1960, by Gilbert Vollink and assigned to the same assignee as the instant application. The device shown in FIG. 8 is generally similar to that shown in FIG. 7 but includes a meter 80 having a main winding or coil 81 and an auxiliary winding or coil 82 of much less turns and effect than the winding 81. The main winding 81 is supplied with power from photo-electric cell 83 through thermistor 84 and resistor 85. A magneto 86 including a coil 87, a magnetized core 88 and a gear 89 of the camera of magnetic material such as iron or steel generates an alternating current voltage in the coil 87 which is rectified by rectifier 90 to supply current to the coil 82 in only the direction in which the torque from the coil 82 opposes the torque from the coil 80. The gear 89 may be one of the gears in the drive mechanism of the camera which has an original function in driving the camera. In the circuit of FIG. 8, at normal speed of the camera the gear 89 is not rotated sufficiently fast to bring the voltage generated in the coil 87 above the threshold voltage of the rectifier 90 and there is substantially no current supplied to the coil 82 from the magneto 86. However, during "Slow Motion" operation, the more rapidly revolved teeth of the gear 89 generate a higher voltage in the coil which is substantially above the threshold voltage of the rectifier and the desired current through the coil 82 is obtained.

In FIG. 9, a circuit forming a further modification of the invention is shown, and includes a magneto 91 like the magneto 24 but connected in series with the photo-electric cell 21 and meter 20 and also has a rectifier 92 connected in opposition to the output of the cell 21. In this circuit, at the slower normal speed operation of the camera, the opposing voltage of the magneto coil 26 opposes the output of the cell 21 to only a small extent, but during the high speed operation provides sufficient opposition to have the desired effect on the meter 20 to keep it from stopping down the exposure control mechanism to the extent it would during normal operation of the camera with the lower shutter speed. The fact that the balls 27 move along the path farther from the core 25 when the camera is operated at the slow speed also acts to make the output of the coil 26 negligible during the slow or "Run" operation of the camera.

In FIGS. 10 and 11, there is shown a further modification of the invention which is substantially identical with the embodiment shown in FIGS. 1 to 7 but omits the switch 29 and includes a magneto 101 in place of the magneto 24. The magneto 101 is generally similar to the magneto 24 and utilizes a governor 102, but has a magnetized core 103 corresponding to the core 25 but positioned adjacent to a band 104 of magnetic material such as steel or iron fixed to driven member 105 of the governor. During slow or normal speed operation of the camera, the end of the core is closely adjacent to a continuous band portion 104a so that there is no change of flux in the core 103 and coil (not shown) associated therewith. However, during "Slow Motion" operation, the driven member 105 is shifted axially to the left from the position of FIG. 10 to the position of FIG. 11 to shift the continuous portion 104a of the band 104 away from the core 103 and shift teeth 104b into positions moving adjacently past the tip of the core 103. The teeth 105 being of magnetic material generate a change of flux in the core 103 (and the coil associated therewith) to oppose to a predetermined extent the driving force of the photo-electric cell on the meter controlling the adjustment of the diaphragm.

The above described magneto devices automatically reduce the effects of the photo-electric cells on the exposure control mechanisms to compensate for the faster shutter speeds during "Slow Motion" operation, and have substantially no effect on the exposure control mechanisms during normal or "Run" operation. While the magneto devices have been described above for the purpose of automatically compensating for higher shutter speed operation, it is obvious that selective switching means may be provided with or without resistors of different resistances to switch in the coils when faster films are used, thus providing film speed compensation for the camera rather than shutter speed compensation.

While the invention is thus described, it is not wished to be limited to the precise details described, as changes may be readily made without departing from the spirit of the invention as defined in the claims.

What is claimed is:

1. In a motion picture camera, an optical objective, a shutter, two-speed shutter drive means including a governor including a plurality of balls of magnetic material revolved in a predetermined path, manual control means for selectively setting the shutter drive means at each of the two speeds, exposure control means, photo-electric means responsive to scene lighting for controlling the exposure control means, coil means having a magnetic core positioned adjacent to the path so that the balls revolving past the core generate voltage in the coil, and switch means operable by the manual control means for connecting the coil means in opposition to the photo-electric means when the shutter is driven at its higher speed.

2. In a motion picture camera, an exposure control device, electric meter means for driving the exposure control device, photo-electric means for controlling the meter means, two-speed shutter drive means, magneto means driven by the shutter drive means, manual means selectively operable to set the shutter drive means at a low speed and at a high speed, and switch means controlled by the manual means for connecting the magneto means to the meter means in opposition to the photo-electric means when the shutter drive means is set at the high speed.

3. The structure of claim 2 wherein the magneto means includes a plurality of balls of magnetic material revolved by the shutter drive means, a permanent magnet core positioned adjacent to the path of the balls so that the flux in the magnet changes each time one of the balls passes the core, and an electric coil on the core and responsive to flux changes in the core.

4. The structure of claim 2 wherein the magneto means includes a gear having teeth of magnetic material driven by the shutter drive means, a permanent magnet core having one end positioned adjacent to the path of the teeth of the gear so that the flux therein changes as the gear teeth are moved past the core, and an electric coil on the core and responsive to flux changes in the core.

References Cited by the Examiner
UNITED STATES PATENTS

| | | | |
|---|---|---|---|
| 1,974,433 | 9/34 | Riszdorfer | 95—10 |
| 2,032,010 | 2/36 | Goodwin | 88—14 |
| 2,261,532 | 11/41 | Tonnies | 95—64 |
| 3,059,526 | 10/62 | Girard | 88—16 |

NORTON ANSHER, *Primary Examiner.*

EMIL G. ANDERSON, WILLIAM MISIEK,
*Examiners.*